Figure 1:
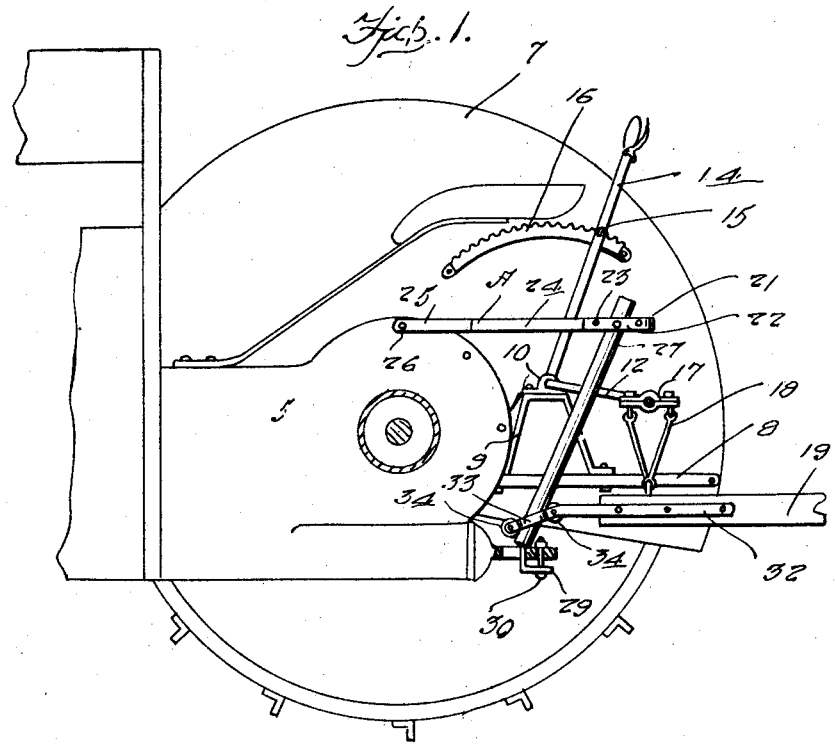

Sept. 24, 1929.  M. S. GREGORY  1,729,104
TRACTOR HITCH
Filed May 1, 1928  2 Sheets-Sheet 1

Inventor
M. S. Gregory
By Clarence A. O'Brien
Attorney

Sept. 24, 1929.  M. S. GREGORY  1,729,104
TRACTOR HITCH
Filed May 1, 1928  2 Sheets-Sheet 2
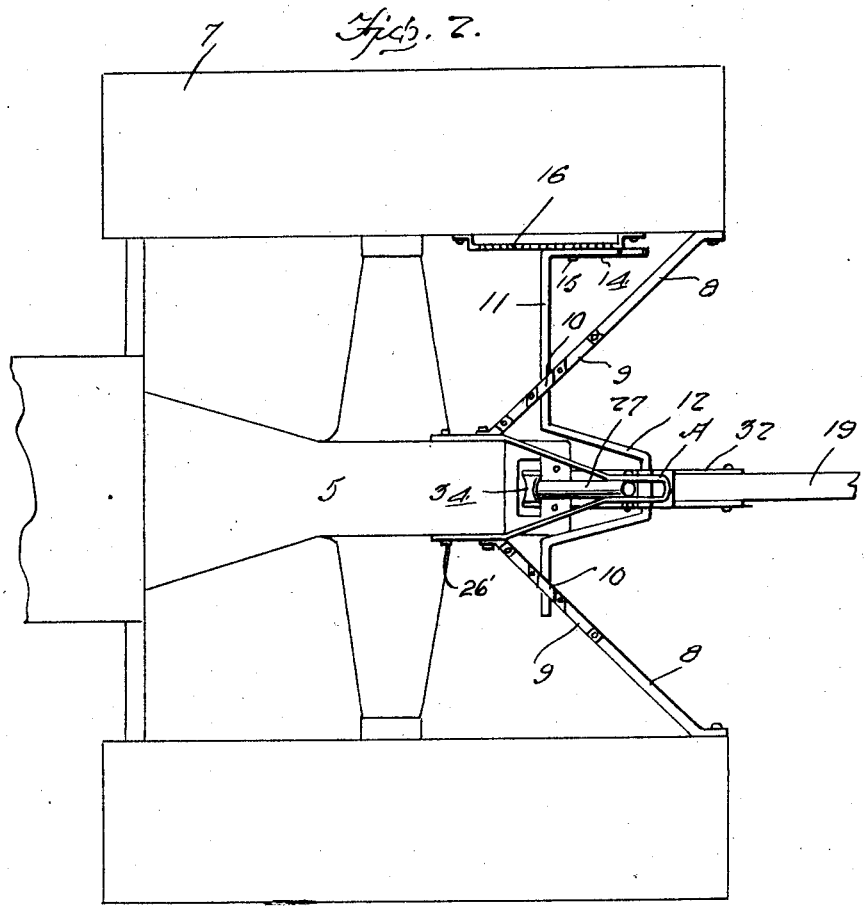
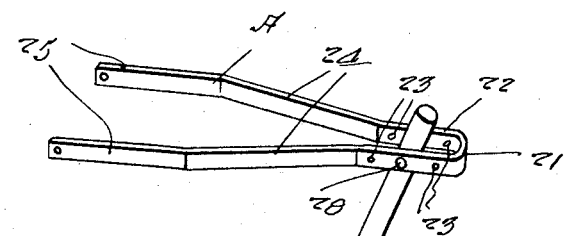
Inventor
M. S. Gregory
By Clarence A. O'Brien
Attorney Patented Sept. 24, 1929

1,729,104

UNITED STATES PATENT OFFICE

MILES S. GREGORY, OF PERRIS, CALIFORNIA

TRACTOR HITCH

Application filed May 1, 1928. Serial No. 274,333.

The present invention relates to a hitch, and has for one of its prime objects the provision of a hitch preferably for use on a tractor, and whereby the vehicle or apparatus to be towed by the tractor may be readily and easily coupled therewith.

An additional object is to provide a hitch for use on a tractor which may be quickly and conveniently adjusted by the operator of the tractor without the inconvenience of leaving the operator's seat.

The device has as a further object, the construction of a tractor hitch which will permit of freedom of movement to the vehicle or other apparatus towed by the tractor, and at the same time keeping the said vehicle or apparatus in an upright position, regardless of any untoward movement of the tractor, e. g. skidding, etc.

The present invention may be said to have as a general object, to provide a hitch which is adjustable, easy to manipulate, simple in construction, strong and durable, inexpensive to manufacture, and thoroughly efficient in use and operation.

With the above and numerous other objects in view as will appear as the description proceeds, the invention resides in certain novel features of construction, and in the combination and arrangement of parts as will be hereinafter more fully described and claimed.

Figure 3:
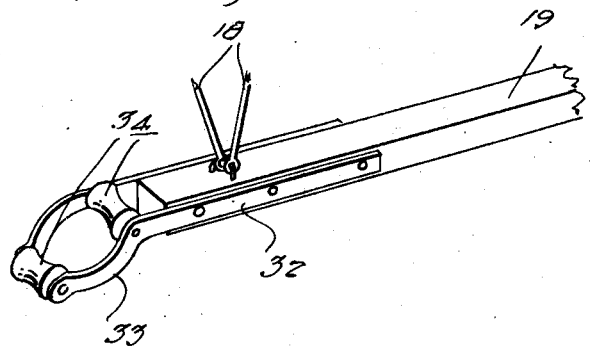

In the drawing:

Figure 1 is a vertical longitudinal section through the rear portion of the tractor showing my improved structure mounted thereon, Figure 2 is a top plan view thereof, Figure 3 is a perspective view of the forward end of the tongue structure for an apparatus being towed, and Figure 4 is a perspective view of the draw bar attached to a bracket.

Referring to the drawing in detail it will be seen that the tractor disclosed is conventional and may be of any preferred construction. As disclosed herein by way of example the tractor includes a differential housing 5, a hitch 6, and fenders 7.

Braces 8 extend from the fenders to the axle housing 5. Brackets 9 rise from intermediate portions of the braces 8 and have bearings 10 at their upper ends for rockably receiving a crank shaft 11. This crank shaft 11 has a crank portion 12 intermediate its ends and at one end has an operating crank 14 which is provided with a detent structure 15 of conventional formation for cooperating with the notched quadrant 16 on one of the fenders 7.

A bearing 17 is mounted on the crank portion 14 and has a pair of links 18 depending downwardly therefrom and engaged with the forward end of a tongue 19 forming part of the apparatus towed by the tractor. A U-shaped bracket A includes a bight portion 21 with legs 22 projecting forwardly therefrom in parallelism and provided with pluralities of apertures 23.

These legs 22 merge into extensions 24 which diverge from each other forwardly and terminate in extensions 25 disposed in parallelism and having their extremities anchored as at 26 on the differential housing 5.

A draw bar 27 has its upper end anchored between the legs 22 by means of a pin 28 projecting through apertures or openings 23 and the lower end of this bar terminates in a reduced angular extension 29 for extending through the opening 26′ and opens therethrough as at 30 so that the bar 27 inclines upwardly and rearwardly.

The inclination of this bar may be changed by placing the pin 28 in another of the openings 23. On the tongue 19 there is fixed to each side thereof a bar 32. These bars 32 project forwardly from the tongue and are pulled outwardly from each other as indicated at 33 and incline downwardly.

A pair of rollers 34 are journaled to the extremities of the projecting portions 33 so that the draw bar may be received therebetween as is clearly indicated in Figure 1. Thus it will be seen that by operating the crank 14 the tongue and bars 32 may be raised and lowered depending upon the height of the apparatus in the rear and other circumstances with which the tractor operator may be encountered.

It is thought that the construction, operation, utility and advantages of the invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description.

It will be apparent that changes in the details of construction, and in the combination and arrangement of the parts may be resorted to without departing from the spirit or scope of the invention as hereinafter claimed or sacrificing any of its advantages.

Having thus described my invention, what I claim as new is:

1. An adjustable tractor hitch of the class described for use with a tractor and a drawing tongue; wherein the tractor includes the differential housing, a disk, a pair of fenders, and braces extending from the housing to the fenders and wherein the tongue includes a pair of bars projecting forwardly therefrom and having a pair of spaced rollers journaled therebetween; comprising a crank shaft having an operated crank portion intermediate its ends operating crank at one end, means for journalling the crank shaft above the braces, a draw bar attached to the hitch and inclining upwardly and rearwardly therefrom, a bracket engaged on the housing and engaged with the upper portion of the draw bar, a bearing on the operated crank portion, and links depending from the bearing and engaged with the tongue, said draw bar extending between said rollers.

2. An adjustable tractor hitch of the class described for use with a tractor and a drawing tongue; wherein the tractor includes the differential housing, a disk, a pair of fenders, and braces extending from the housing to the fenders and wherein the tongue includes a pair of bars projecting forwardly therefrom and having a pair of spaced rollers journaled therebetween; comprising a crank shaft having an operated crank portion intermediate its operating crank at one end, means for journalling the crank shaft above the braces, a draw bar attached to the hitch and inclining upwardly and rearwardly therefrom, a bracket engaged on the housing and engaged with the upper portion of the draw bar, a bearing on the operated crank portion, and links depending from the bearing and engaged with the tongue, said draw bar extending between said rollers, means for rockably mounting the crank shaft comprising a pair of brackets rising from the braces and bearings at the upper ends thereof.

3. An adjustable tractor hitch of the class described for use with a tractor and a drawing tongue; wherein the tractor includes the differential housing, a disk, a pair of fenders, and braces extending from the housing to the fenders and wherein the tongue includes a pair of bars projecting forwardly therefrom and having a pair of spaced rollers journaled therebetween; comprising a crank shaft having an operated crank portion intermediate its operating crank at one end, means for journalling the crank shaft above the braces, a draw bar attached to the hitch and inclining upwardly and rearwardly therefrom, a bracket engaged on the housing and engaged with the upper portion of the draw bar, a bearing on the operated crank portion, and links depending from the bearing and engaged with the tongue, said draw bar extending between said rollers, means for rockably mounting the crank shaft comprising a pair of brackets rising from the braces and bearings at the upper ends thereof, a detent structure on the operating crank, and a notched quadrant on one of the fenders associated with the detent structure.

4. A hitch apparatus for use with tractors and a towing tongue; wherein the tractor includes a housing for the differential, a hitch, a pair of fenders, and braces extending between the fenders and the housing; comprising a pair of brackets rising from the braces, bearings on the upper ends of the brackets, a crank shaft journaled in the bearing and including an intermediate operated crank and an end operating crank, a pair of bars fixed to the sides of the tongue and projecting forwardly thereof, and having rollers journaled therebetween, a draw bar fixed to the hitch and extending upwardly and inclining rearwardly and extending between the rollers, a bracket structure engaged on the casing and engaged with the upper end of the draw bar, a bearing on the operated crank, links depending from the last mentioned bearing and engaged with the tongue.

5. A hitch structure of the class described, comprising a crankshaft having an intermediate crank portion and an end crank portion, means for rockably mounting the crank shaft on a tractor, a pair of bars for attachment to a tongue to project forwardly therefrom, rollers journalled between the bars, a draw bar, means for attaching the draw bar to the hitch of a tractor to extend between the rollers, a bracket structure suitably mounted on the tractor and adapted to engage with the upper end of the draw bar, means on the bracket for spacing the draw bar to incline upwardly and rearwardly, and a bearing on the intermediate crank portion and provided with links extending downwardly for engagement with the tongue.

In testimony whereof I affix my signature.

MILES S. GREGORY.